(12) United States Patent
Bishop

(10) Patent No.: US 12,344,366 B2
(45) Date of Patent: Jul. 1, 2025

(54) AIRCRAFT LANDING GEAR

(71) Applicant: Airbus Operations Limited, Bristol (GB)

(72) Inventor: Benjamin Bishop, Bristol (GB)

(73) Assignee: Airbus Operations Limited, Bristol (GB)

( * ) Notice: Subject to any disclaimer, the term of this patent is extended or adjusted under 35 U.S.C. 154(b) by 39 days.

(21) Appl. No.: 18/320,619

(22) Filed: May 19, 2023

(65) Prior Publication Data

US 2023/0373613 A1 Nov. 23, 2023

(30) Foreign Application Priority Data

May 20, 2022 (GB) .................................... 2207427

(51) Int. Cl.
*B64C 25/10* (2006.01)
(52) U.S. Cl.
CPC .................................. *B64C 25/10* (2013.01)
(58) Field of Classification Search
CPC .............................. B64C 25/10; B64C 25/12
See application file for complete search history.

(56) References Cited

U.S. PATENT DOCUMENTS

| | | | |
|---|---|---|---|
| 2,960,288 A | 11/1960 | Hartel | |
| 5,086,995 A | 2/1992 | Large | |
| 6,811,116 B1 | 11/2004 | Briancourt | |
| 7,416,156 B2 * | 8/2008 | Hinton | B64C 25/12 244/102 R |
| 2006/0006282 A1 * | 1/2006 | Mellor | B64C 25/10 244/102 A |
| 2013/0056582 A1 * | 3/2013 | De Conto | B64C 25/12 244/102 A |
| 2018/0065733 A1 * | 3/2018 | Mellor | B64C 25/26 |
| 2018/0362150 A1 * | 12/2018 | Sakota | B64C 25/12 |

FOREIGN PATENT DOCUMENTS

| | | |
|---|---|---|
| EP | 2 822 853 B1 | 9/2019 |
| GB | 0 465 278 A | 5/1937 |
| GB | 2 551 380 A | 12/2017 |
| GB | 2 552 690 A | 2/2018 |

OTHER PUBLICATIONS

Combined Search and Examination Report for Application No. GB 2207427.2, nine pages, dated Nov. 18, 2022.
Extended European Search Report for Application No. 23173462.5, 11 pages, dated Sep. 25, 2023.

* cited by examiner

*Primary Examiner* — Richard G Davis
(74) *Attorney, Agent, or Firm* — Nixon & Vanderhye P.C.

(57) ABSTRACT

An aircraft is disclosed having a landing gear with a main support supporting one or more wheels. The landing gear has at least two sidestays by which landing gear loads can be propagated from the landing gear to the body of the aircraft. The sidestays are attached at one end to a rotatable yoke via joints which allow relative movement between the sidestays and the yoke so that the yoke can rotate about a yoke axis. Rotation of the yoke about the yoke axis, permitted by the joints, can help distribute loads between the two sidestays and/or combat negative effects resulting from an unfavourable tolerance stack during assembly, for example.

19 Claims, 10 Drawing Sheets

AIRCRAFT LANDING GEAR

CROSS RELATED APPLICATION

This application claims priority to United Kingdom Patent Application GB 2207427.2 filed May 20, 2022, the entire contents of which is hereby incorporated by reference.

BACKGROUND OF THE INVENTION

The present disclosure relates to the field of aircraft landing gear, in particular retractable landing gear which is movable between a deployed position for use during take-off, landing, taxiing and the like, and a stowed position in which the aerodynamic effect of the landing gear is reduced for normal flight.

The primary loads experienced by a landing gear during normal operations are typically categorised as vertical loads, drag loads and lateral loads. Typically, vertical loads act along an axis parallel to the vertical axis of the aircraft and are generated by the action of gravity on the mass of the aircraft, in particular during landing. Drag loads act along an axis substantially parallel to the longitudinal axis of the aircraft and are generated by friction between the tyres and ground on 'spin up' of the wheels at touchdown and also when braking. Lateral loads act along an axis substantially parallel to the lateral axis of the aircraft and are generated during steering. The landing gear may also be subject to secondary loads such as torque loads and aerodynamic drag.

Conventional landing gear often has a main support such as an oleo strut with one or more wheels, and auxiliary supports in the form of sidestays. The sidestays generally extend diagonally upward from the main support to the body of the aircraft (for instance a wing and/or the fuselage) and provide additional support. For instance, inboard and outboard sidestays may be used to bear some of the lateral loads, or fore and aft sidestays may be used for bearing some of the drag loads.

One problem with conventional designs with at least two sidestays is that there is a significant tolerance stack in play. This can lead to problems during assembly (for instance with components not fitting in their intended positions/orientations). Also, the tolerance stack can mean that loads may not propagate through the landing gear in the desired fashion; some components may be under-utilised and other components may be over-loaded. Furthermore, sidestays often have a joint along their length so that they can fold to allow stowing of the landing gear, and lock into an over-centre position when the landing gear is deployed so as to withstand compressive loads. The tolerance stack can obstruct the proper function of this over-centre mechanism (for instance with one or both sidestays reaching their centre position too early or too late during deployment of the landing gear and causing elastic deformation of the landing gear).

Accordingly, conventional designs with at least two sidestays can require relatively lengthy assembly and/or high levels of parts wastage (due to the need for different parts to be tried in combination in order to arrive at a usable tolerance stack), and/or require unduly precise and expensive manufacturing techniques to be used to reduce the tolerance of each part in the stack. Instead or as well, the indeterminate nature of load propagation, due to the tolerance stack in particular, can require components to be over-engineered so as to provide an enhanced factor of safety (with an associated effect on the weight, size and/or cost of the landing gear), and/or can necessitate more frequent inspection and maintenance due to the potential for undesirably unbalanced forces to be brought about during use.

The present invention seeks to mitigate at least one of the above disadvantages, and/or to provide an improved or alternative landing gear, aircraft, or method of distributing loads in a landing gear.

SUMMARY OF THE INVENTION

According to a first aspect of the invention there is provided an aircraft comprising a landing gear, the landing gear comprising: a main support supporting one or more wheels, the main support being movable between stowed and deployed configurations relative to the body of the aircraft; at least first and second sidestays, each sidestay extending between a first mounting point at the body of the aircraft and a second mounting point at the main support; and a yoke constrained for rotation about a yoke axis, wherein: in use when the landing gear is in the deployed configuration, the main support and the sidestays are arranged to collectively transfer substantially all landing gear loads to the body of the aircraft; and one of said mounting points of each sidestay is provided on the yoke, and forms a joint arranged to permit relative movement between that sidestay and the yoke so as to allow rotation of the yoke about the yoke axis.

The joints permitting relative movement between the sidestays and the yoke so as to allow rotation of the yoke can allow the rotational position of the yoke to vary based on the requirements placed upon it by the landing gear. For sake of example the yoke can rotate so as to adjust the distances between the sidestays' first and second mounting points and thereby adapt to manufacturing variation during assembly. As another example, the yoke can rotate so as to allow stress experienced by one sidestay to propagate to another sidestay and thereby share the load. As a further example, the yoke rotating can assist with the operation of an over-centre mechanism of one or more of the sidestays.

The landing gear may comprise precisely two sidestays. Accordingly, the main support, the first sidestay and the second sidestay may be arranged to collectively transfer substantially all landing gear loads to the body of the aircraft.

The yoke may be generally cylindrical in shape and/or generally flat in a plane normal to the yoke axis. The yoke may comprise a bore for rotatably receiving a pivot member such as a pin so as to constrain the yoke for rotation about the yoke axis. The yoke may be symmetrical, for instance the yoke may have rotational symmetry and/or may be symmetrical about a line of symmetry (for instance a line of symmetry which runs equidistantly between the mounting points of the first and second sidestays).

The body of the aircraft may comprise a cavity within which the landing gear is received, for example substantially entirely received, when the main support is in the stowed configuration. The cavity may be provided in a wing and/or in the fuselage of the aircraft, for example.

Each of said joints may permit relative pivoting movement between that sidestay and the yoke. This can provide an advantageously robust, simple, strong, easily serviced and/or mechanically stable joint. In other embodiments, however, each of said joints may permit a different type of motion instead of or as well as pivoting motion, such as sliding motion and/or rolling motion. For example, meshing gear teeth may be provided on the yoke and sidestays such that each sidestay forms a rack and pinion type mechanism with the yoke.

Each of the mounting points on the yoke may occupy a fixed angular position on the yoke, such that said mounting points are constrained to rotate about the yoke axis synchronously with the yoke. This can ensure that movement of said mounting points brings about rotation of the yoke (or vice versa), thereby providing an advantage such as one of those discussed above, rather than there being potential for the mounting points to move without the yoke (or for the yoke to move without the mounting points). Nonetheless, in some circumstances it may be that the mounting points on the yoke are movable relative to the yoke about the yoke axis to a limited extent, for instance to allow for shock absorption between the sidestays and the yoke.

One or both of the sidestays may be substantially torsionally rigid. In other words, one or both of the sidestays may resist rotation of one end relative to the other end about an axis aligned with the length of the sidestay.

The main support may be configured to bear at least 50% (for instance at least 70%, at least 80% or at least 90%) of any vertical load experienced by the landing gear during normal use. Accordingly, the first and second sidestays may be configured such that in combination they bear no more than 50% (for instance no more than 30%, no more than 20% or no more than 10%) of any such vertical load.

The main support may be configured to bear substantially all of any such vertical load. Accordingly, the first and second sidestays may each be configured to bear substantially only lateral loads and/or drag loads. It is to be appreciated that the main support may be considered to bear substantially all vertical loads even if elastic deformation of the landing gear under load causes a sidestay bear a small proportion (for instance less than 5%, less than 2% or less than 1%) of a vertical load.

The yoke axis may be generally upright when the main support is in the deployed configuration. For example, where the main support comprises a main strut or an Oleo strut, the yoke axis may be generally parallel to or collinear with a longitudinal axis of said strut. An axis may be considered to be generally upright if, for example, it is positioned at an angle of less than 30 degrees (for instance less than 20 degrees or less than 10 degrees) to the vertical.

With the main support in the deployed configuration, each sidestay may extend along a generally straight line between its mounting points. As an alternative, with the main support in the deployed configuration one or both of the sidestays may extend along a curved path or a path with one or more discrete bends in it.

With the main support in the deployed configuration, the sidestays may be positioned to hold the yoke in a fixed rotational position about the yoke axis.

The yoke would thus be constrained for rotation about the yoke axis, but held in a fixed position by the sidestays. This can allow the landing gear to be more stable (and thus potentially stronger and/or more rigid) in use than would be the case if the yoke was free to rotate to some extent when the main support was in the deployed position. Instead or as well, the sidestays holding the yoke in a fixed rotational position can reduce wear between bearing surfaces of the yoke and another component.

With the main support in the deployed configuration, the first sidestay may experience stress which acts to urge the yoke to rotate about the yoke axis in one direction, and the second sidestay may experience stress which acts to urge the yoke to rotate about the yoke axis in the opposite direction.

This can make the position of the yoke less susceptible to becoming loose over time due to components wearing or 'bedding in' (as may be the case in an embodiment where the yoke is held in a fixed rotational position by the sidestays but with the sidestays not experiencing any stress). Instead or as well, it can provide the yoke with a self-centering action about an equilibrium point, wherein the yoke being disturbed from that equilibrium point increases the stress in one sidestay and reduces the stress in the other, the resulting imbalance then urging the yoke back to the equilibrium position.

The stress may be compressive in both sidestays (with both sidestays then pushing the yoke in opposite directions). As an alternative, the stress may be tensile in both sidestays (with the sidestays then pulling the yoke in opposite directions). As another alternative, one sidestay may be in tension and the other in compression, with one sidestay pulling the yoke in one direction and one sidestay pushing the yoke in the opposite direction.

The yoke may be constrained so as to be substantially prevented from translational movement when the main support is in the deployed configuration.

Translational movement of the yoke being prevented can reduce the number of degrees of freedom which the yoke has (for instance to only rotation about the yoke axis), thereby making the landing gear more stable and/or rigid. Instead or as well, the reduced number of degrees of freedom can allow the forces experienced by different components of the landing gear to be predicted more accurately, thereby allowing greater optimisation of the design of the landing gear.

As an alternative, the yoke may be constrained for rotation about the yoke axis but also able to move by translation in one or more directions (for example in an axial direction along the yoke axis). This could avoid the yoke preventing the utilisation of a desired mechanism by which the landing gear can move between deployed and stowed configurations and/or a desired shock absorbing movement of the landing gear.

The mounting points of the first and second sidestays that are provided on the yoke may be provided at different locations on the yoke about the yoke axis.

This can allow the forces experienced by the yoke to be spread over a greater area, thereby reducing the risk of damage to the yoke by shock loading or the like.

The mounting points of the first and second sidestays may be provided at least 45 degrees apart from one another, for instance at least 90 degrees, at least 135 degrees or around 180 degrees apart from one another, around the yoke axis.

The mounting points of the first and second sidestays may be provided at substantially the same axial position on the yoke along the yoke axis. This can reduce unbalanced loading on the yoke that urges the yoke to move in a direction other than around the yoke axis, thereby reducing wear on the yoke and/or components relative to which the yoke can move.

The joint of each sidestay may include a coupling member which is rotatably attached to the yoke and rotatably attached to the respective sidestay.

This can provide an advantageously mobile joint, and/or a joint with advantageous strength and/or ease of manufacture. Instead or as well, the coupling member being rotatable relative to both the yoke and the sidestay can allow the joint to experience less wear, and thus improved longevity, in contrast to an arrangement where all movement between the yoke and the sidestay had to be borne by a single point of rotatable attachment.

As an alternative, each sidestay may have an integral coupling member rotatably received within a bore in the yoke. As another alternative, the yoke may comprise a pair of integral coupling members each received within a bore in the corresponding sidestay. As another alternative, each sidestay may have an end portion which abuts a complementary recess in the yoke, for instance forming a ball and socket joint.

Each coupling member may be rotatable relative to the yoke about a first axis, and rotatable relative to the respective sidestay about a second axis which is generally perpendicular to the first axis.

The axes being generally perpendicular to one another can increase the range of motion which can take place at the joint, thereby potentially allowing a larger range of relative positions between the sidestay and the joint to be reached without deformation of a component.

The yoke ay be rotatable in a rotation plane which is normal to the yoke axis, and with the main support in the deployed configuration the sidestays may define a sidestay plane, the rotation plane and the sidestay plane being positioned at an angle of no more than 60 degrees to one another.

Accordingly, when rotation of the yoke causes the mounting points on the yoke to move in the rotation plane (or a plane parallel thereto), a relatively large vector component of that movement can takes place in the sidestay plane. This can have the effect that rotation of the yoke causes significant movement of the mounting points of each sidestay towards or away from one another. Equally, it may allow a change in distance between the mounting points of a sidestay to bring about significant rotation of the yoke.

A joint may be considered to permit relative movement between a sidestay and the yoke if, for example, it allows relative movement of that sidestay and the yoke about an axis which is non-perpendicular to the yoke axis. For example, with the main support in the deployed configuration, each of said joints may allow relative rotation between the respective sidestay and the yoke about an axis which is positioned at an angle of no more than 80 degrees to the yoke axis, for instance no more than 70 degrees or no more than 60 degrees to the yoke axis. Indeed, with the main support in the deployed configuration, each of said joints may allow relative rotation between the respective sidestay and the yoke about an axis which is positioned at an angle of no more than 50 degrees, no more than 40 degrees or no more than 30 degrees to the yoke axis.

Relative rotation between the sidestay and the yoke about such an axis can improve the ease with which the yoke can rotate, for example reducing the extent to which rotation of the yoke causes other components or joints to flex to accommodate the new position of the yoke and/or a sidestay. In contrast, in an arrangement where a sidestay and the yoke were movable about an axis positioned near to perpendicular to the yoke axis, rotation of the yoke may force the sidestay in question to move in a manner which placed undesirable levels of stress on the sidestay or another component.

With the main support in the deployed configuration, the sidestays may converge towards the yoke.

This can allow the yoke to be a relatively small component, which in turn can allow it to be lighter, to be cheaper, to take up less space and/or to have less angular momentum when rotating. Nonetheless, in other embodiments the sidestays may diverge towards the yoke or may run to the yoke parallel to one another.

With the main support in the deployed configuration: the first mounting point of the first sidestay may be provided further forward than the second mounting point of the first sidestay; and the first mounting point of the second sidestay may be provided further aft than the second mounting point of the second sidestay.

The sidestays may thus aligned to run fore and aft to some extent, which can allow them to provide particularly effective support against drag loads.

With the main support in the deployed configuration, the sidestays may be positioned on the same side of the main support along the pitch axis of the aircraft.

The sidestays may both be positioned inboard of the main support, or may both be positioned outboard of the main support.

The sidestays being positioned on the same side of the main support can allow the landing gear to move between deployed and stowed configurations using an advantageously simple mechanism, and/or can allow the landing gear to be advantageously compact when in the stowed configuration.

As an alternative, one sidestay may be positioned on each side of the main support along the pitch axis of the aircraft. As another alternative, one or both sidestays may be located at the same position along the pitch axis as the main support (for instance running only forward and upward, or running only aft and upward, from the main support).

At least one of the sidestays may comprise two longitudinal portions which are pivotally connected to one another so as to allow said sidestay to fold.

One or both of the first and second sidestays may be foldable in this manner. This can allow the landing gear to move between deployed and stowed configurations using an advantageously simple mechanism, and/or can allow the landing gear to be advantageously compact when in the stowed configuration.

Instead or as well, one or both of the first and second sidestays may be permanently straight, for instance comprising a single continuous elongate member running between the mounting points.

Instead or as well, one or both of the first and second sidestays may be telescopically extendable.

The main support and the sidestays may be configured such that movement of the main support from the deployed configuration towards the stowed configuration includes movement of the main support towards the sidestays.

This can allow the landing gear to be advantageously compact when in the stowed configuration, and/or can allow the landing gear to move between deployed and stowed configurations using an advantageously simple mechanism.

The sidestays and yoke may be arranged such that movement of the main support between the deployed and stowed configurations brings about relative movement between the sidestays and the yoke axis, that relative movement being accommodated by rotation of the yoke about the yoke axis.

This can allow the main support to move between the deployed and stowed configurations advantageously smoothly and/or with advantageously little stress placed on components of the landing gear during said movement. Instead or as well it may allow the landing gear move between configurations using an advantageously simple mechanism.

The yoke may be attached to the main support and movable therewith.

The main support may comprise a main strut, and the yoke may be rotatably mounted around said strut in the manner of a collar.

This can provide an advantageously simple and/or strong mechanism by which the yoke can be constrained for rotation.

Alternatively, where the yoke is attached to the main support and movable therewith the yoke may be mounted e.g. on a surface of the main support, on a projection extending from or within the main support, or within a cavity provided in the main support.

The yoke ay rotatably fixed to the body of the aircraft, the main support moving relative to the yoke when moving between the stowed and deployed configurations.

For example, the yoke may be rotatably fixed to a wing of the body or to the fuselage of the body. The yoke may be positioned in a cavity in the body of the aircraft (e.g. in a wing or in the fuselage). As an alternative, the yoke may be positioned on an external surface of the body of the aircraft.

Where the yoke is rotatably fixed to the body of the aircraft, the body of the aircraft may comprise a strut and the yoke may be positioned around said strut in the manner of a collar.

According to a second aspect of the present invention there is provided an aircraft comprising a landing gear, the landing gear comprising: a main support supporting one or more wheels, the main support being movable between stowed and deployed configurations relative to the body of the aircraft; a yoke mounted on the main support and movable therewith; and at least first and second sidestays, each sidestay extending between a first mounting point at the body of the aircraft and a second mounting point on the yoke, wherein: the yoke is mounted for rotation about a yoke axis relative to the main support; each second mounting point forms a pivot joint between the yoke and the respective sidestay which has a pivot joint axis; and each pivot joint axis is non-perpendicular to the yoke axis.

With the pivot joint axes being non-perpendicular to the yoke axis, movement at the joints can allow the yoke to rotate about the yoke axis without causing excessive stress or deformation at the joints, thereby allowing the rotational position of the yoke to vary based on the requirements placed upon it by the landing gear (for example to adjust the distances between the sidestays' first and second mounting points, to allow stress experienced by one sidestay to propagate to another sidestay and thereby share the load, and/or to assist with the operation of an over-centre mechanism of one or more of the sidestays).

Each pivot joint axis may be positioned at an angle of no more than 80 degrees, no more than 70 degrees, no more than 60 degrees, no more than 50 degrees, no more than 40 degrees or no more than 30 degrees to the yoke axis.

In use when the landing gear is in the deployed configuration, the main support and the sidestays may collectively transfer substantially all landing gear loads to the body of the aircraft.

According to a third aspect of the present invention there is provided an aircraft comprising a landing gear, the landing gear comprising: a main support supporting one or more wheels, the main support being movable between stowed and deployed configurations relative to the body of the aircraft; a yoke mounted on the body of the aircraft, the main support moving relative to the yoke when moving between the stowed and deployed configurations; and at least first and second sidestays, each sidestay extending between a first mounting point on the yoke and a second mounting point at the main support, wherein: the yoke is mounted for rotation about a yoke axis relative to the body of the aircraft; each first mounting point forms a pivot joint between the yoke and the respective sidestay which has a pivot joint axis; and each pivot joint axis is non-perpendicular to the yoke axis.

As above, with the pivot joint axes being non-perpendicular to the yoke axis, movement at the joints can allow the yoke to rotate about the yoke axis without causing excessive stress or deformation at the joints, thereby allowing the rotational position of the yoke to vary based on the requirements placed upon it by the landing gear.

Each pivot joint axis may be positioned at an angle of no more than 80 degrees, no more than 70 degrees, no more than 60 degrees, no more than 50 degrees, no more than 40 degrees or no more than 30 degrees to the yoke axis.

In use when the landing gear is in the deployed configuration, the main support and the sidestays may collectively transfer substantially all landing gear loads to the body of the aircraft;

According to a fourth aspect of the present invention there is provided a method of distributing landing gear loads in an aircraft including a landing gear comprising: a main support supporting one or more wheels, the main support being movable between stowed and deployed configurations relative to the body of the aircraft; at least first and second sidestays, each sidestay extending between a first mounting point at the body of the aircraft and a second mounting point at main support; and a yoke constrained for rotation about a yoke axis, one of said mounting points of each sidestay being provided on the yoke and forming a joint arranged to permit relative movement between that sidestay and the yoke, wherein when the landing gear is in the deployed configuration and under load, the joke moves relative to each of the sidestays and rotates about the yoke axis so as to redistribute forces between the sidestays.

The yoke rotating to redistribute forces can avoid uneven loading between the two sidestays which could otherwise lead to deformation of the landing gear and/or premature need for servicing due to excessive loading of particular components.

According to a fifth aspect of the present invention there is provided a landing gear for use as a landing gear in an aircraft according to the first, second or third aspect of the invention and/or a method according to the fourth aspect of the invention.

The landing gear may therefore provide one or more of the advantages discussed above.

It will of course be appreciated that features described in relation to one aspect of the present invention may be incorporated into other aspects of the present invention. For example, a method according to the invention may incorporate any of the features described with reference to the aircraft and/or landing gear of the invention and vice versa. Further, it is to be noted that methods described herein are not intended to be limited to the steps of those methods being performed in the order in which they are recited. It would be readily apparent to the skilled person where steps can, or cannot, be performed in a different order.

DESCRIPTION OF THE DRAWINGS

Embodiments of the present invention will now be described by way of example only with reference to the accompanying schematic drawings of which.

DETAILED DESCRIPTION

Figure 1:
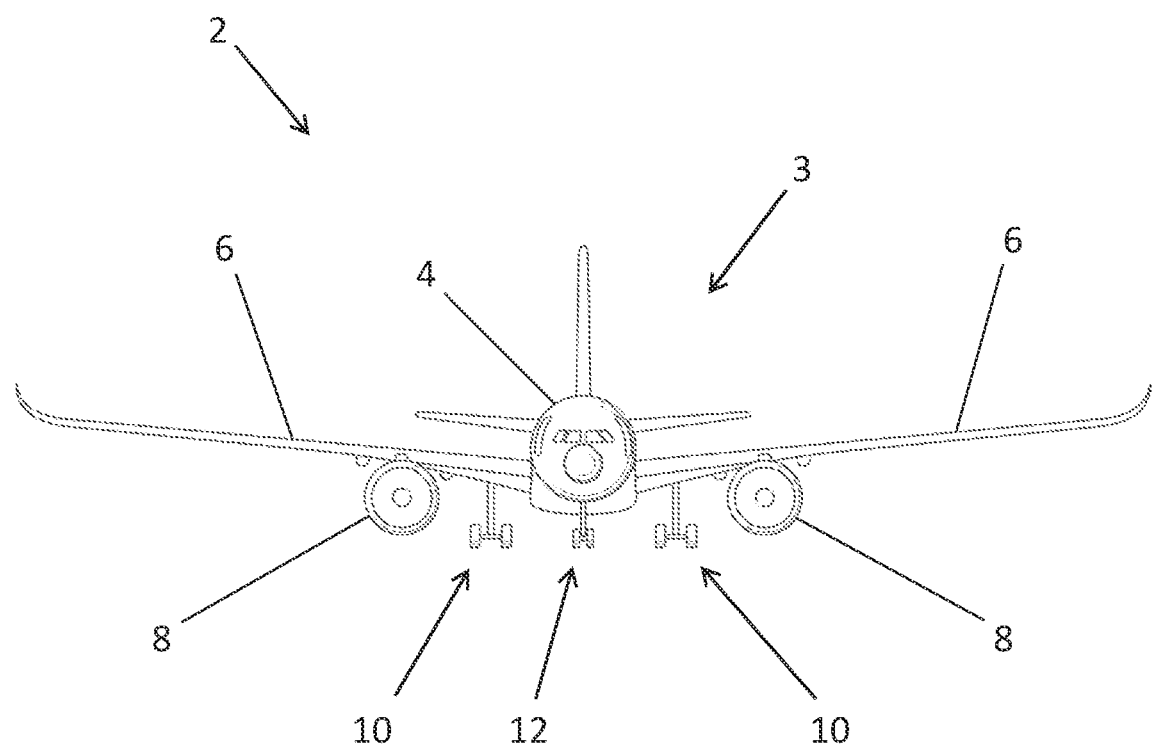
FIG. 1 shows a front view of an aircraft according to a first example embodiment.

FIG. 1 shows an aircraft 2 according to a first example embodiment of the invention. It has a body 3 comprising a fuselage 4 and two wings 6. Each wing 6 has an engine 8 mounted thereto. The aircraft 2 has two main landing gear 10, each depending from a respective wing 6, and a nose landing gear 12. All the landing gear 10, 12 are shown in a deployed configuration in FIG. 1. The landing gear 10, 12 can be moved from the deployed configuration to a stowed configuration as discussed in more detail later. In this embodiment the nose landing gear 12 is of conventional design and will not be discussed in detail herein.

Figure 2:
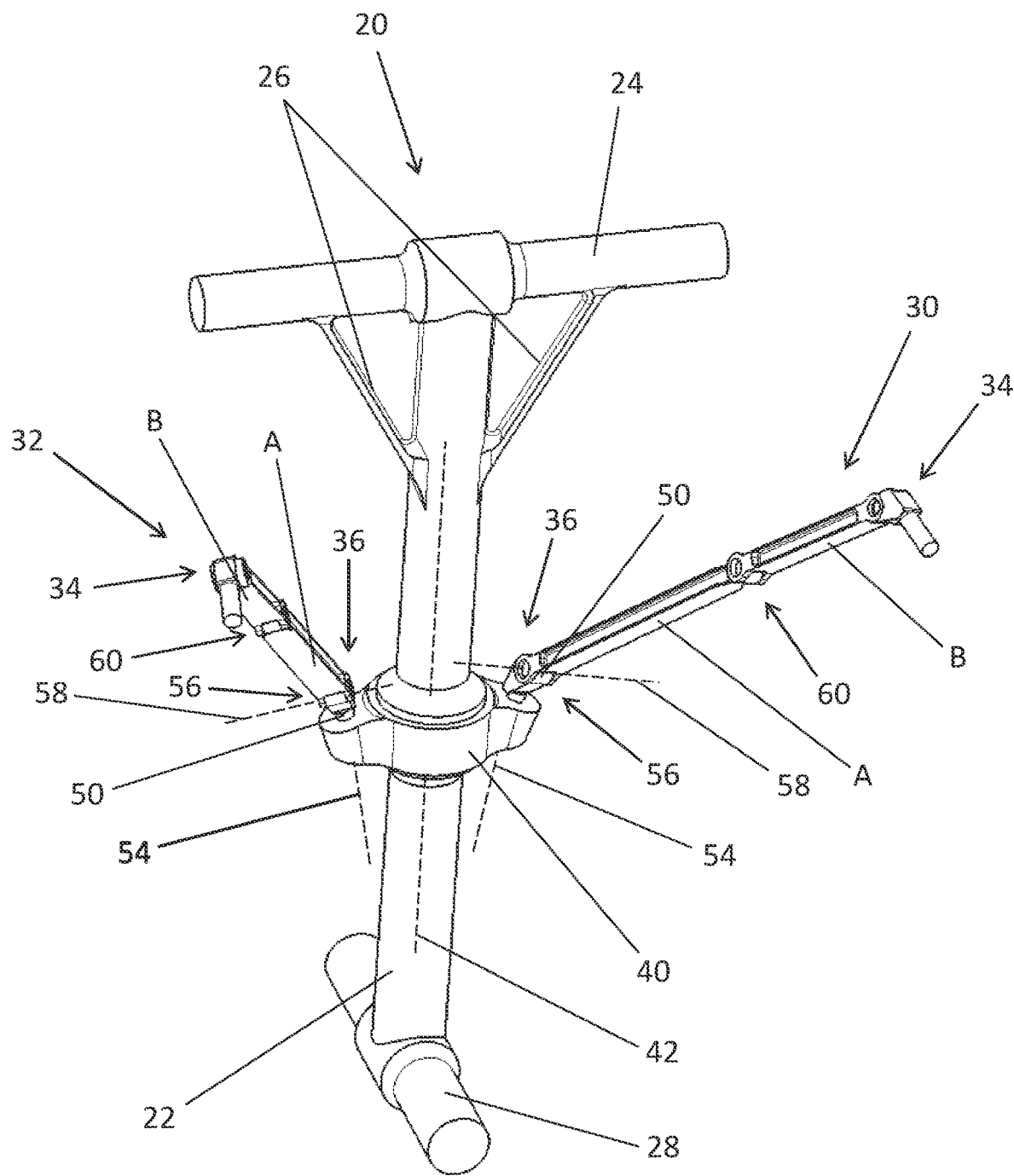
FIG. 2 shows a perspective view of part of a main landing gear of the embodiment of FIG. 1.
Figure 3:
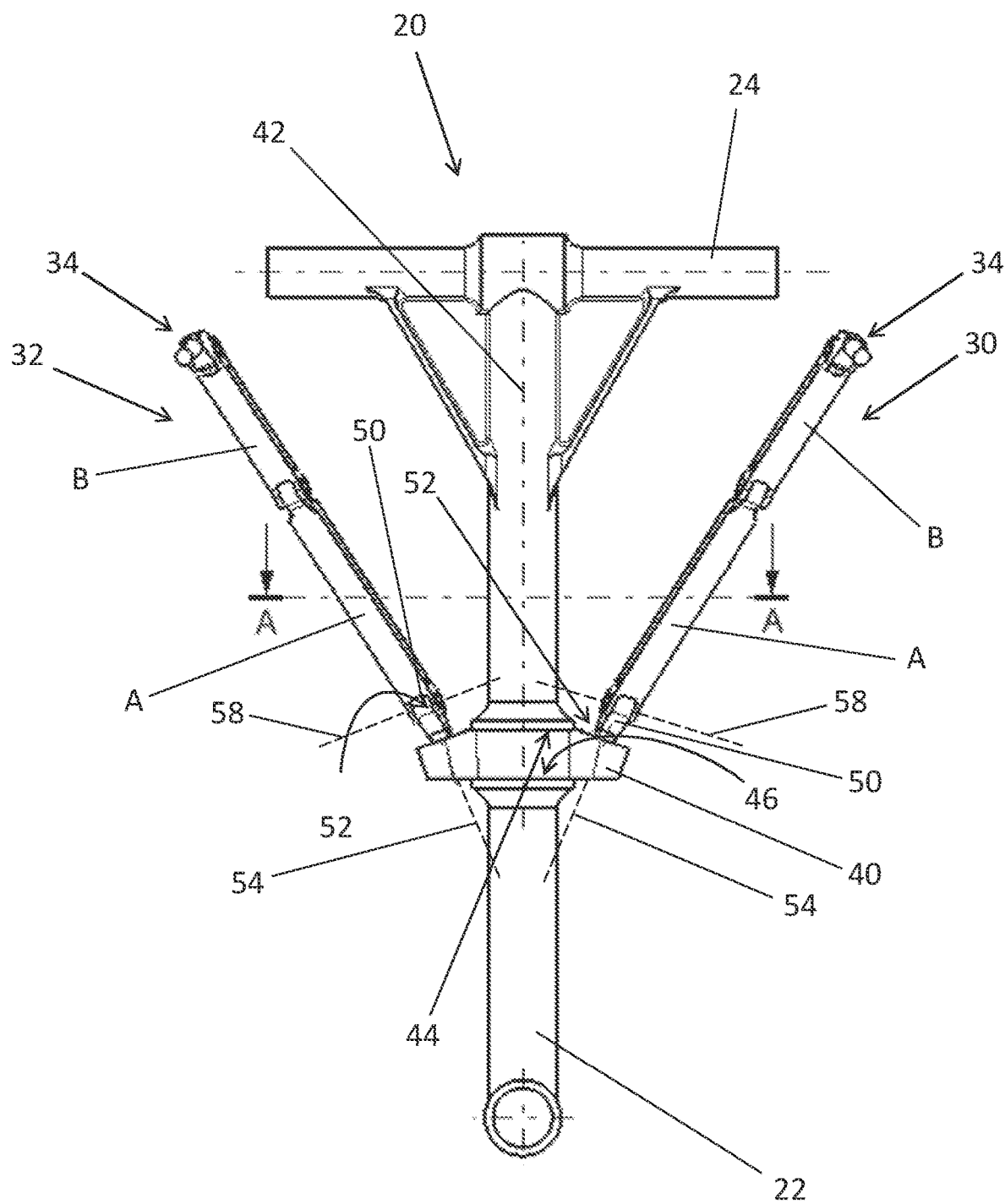
FIG. 3 shows a side view of the part of the landing gear shown in FIG. 2.
Figure 4:
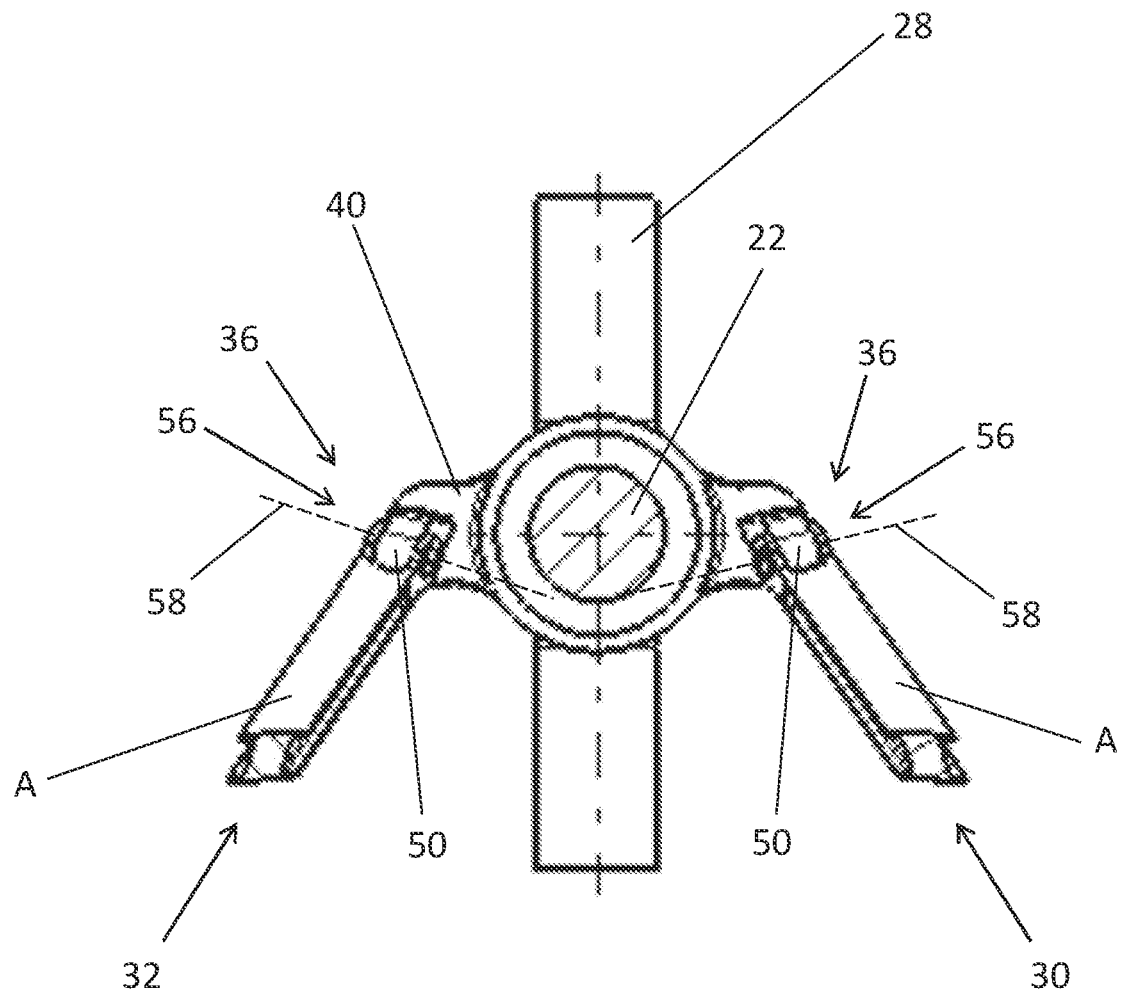
FIG. 4 shows a cross-sectional plan view of the part of the landing gear shown in FIGS. 2 and 3, taken at plane A-A.
Figure 5:
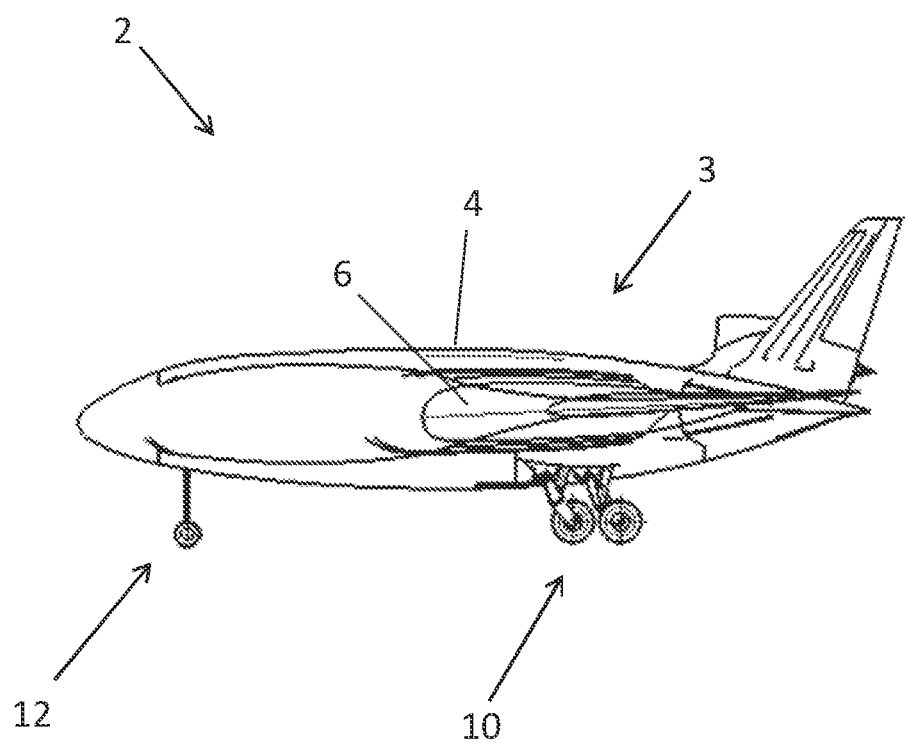
FIG. 5 shows a side view of an aircraft according to a second example embodiment of the invention.
Figure 6:
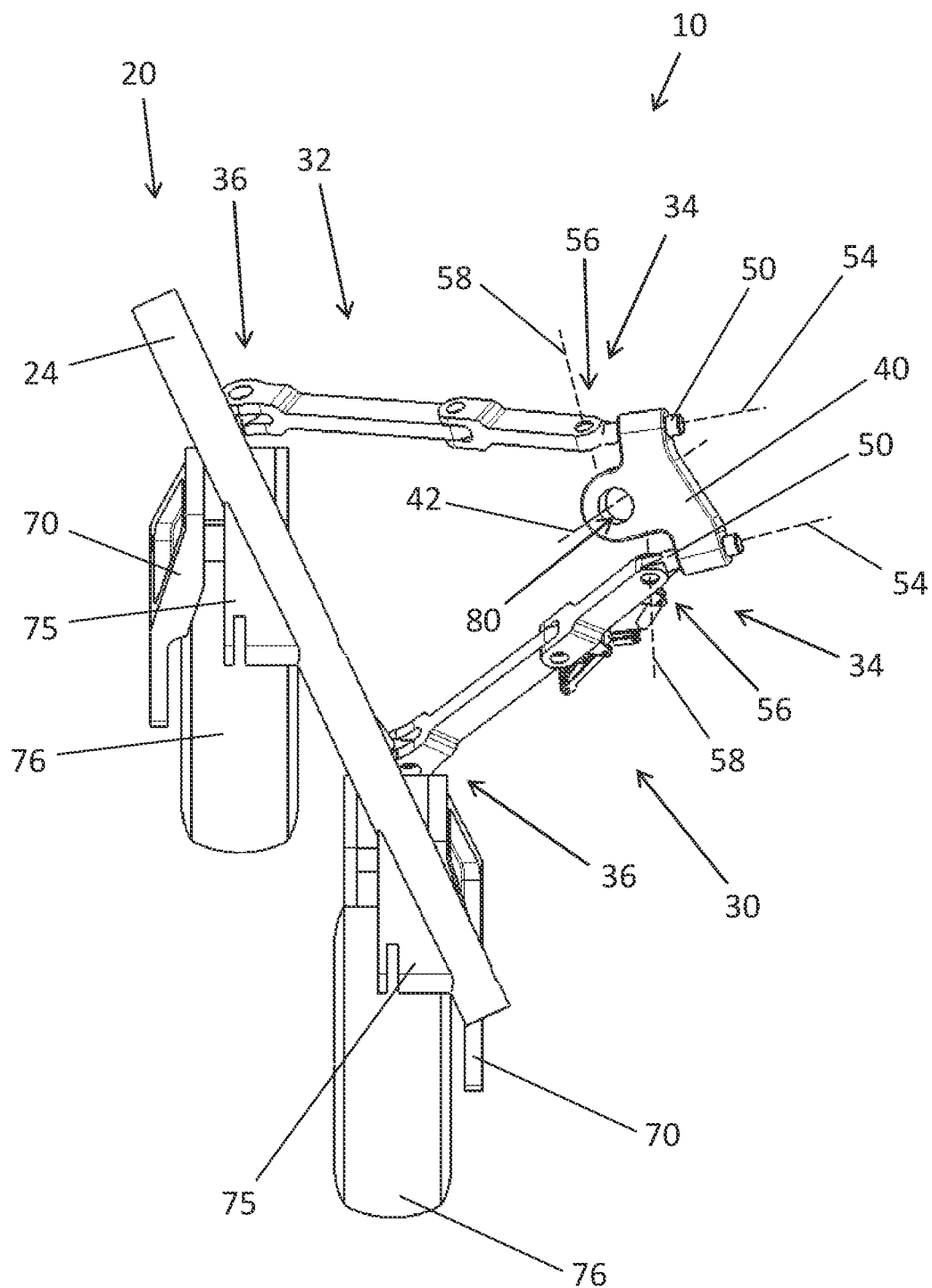
FIG. 6 shows a main landing gear of the embodiment of FIG. 5, in a deployed configuration.
Figure 7:
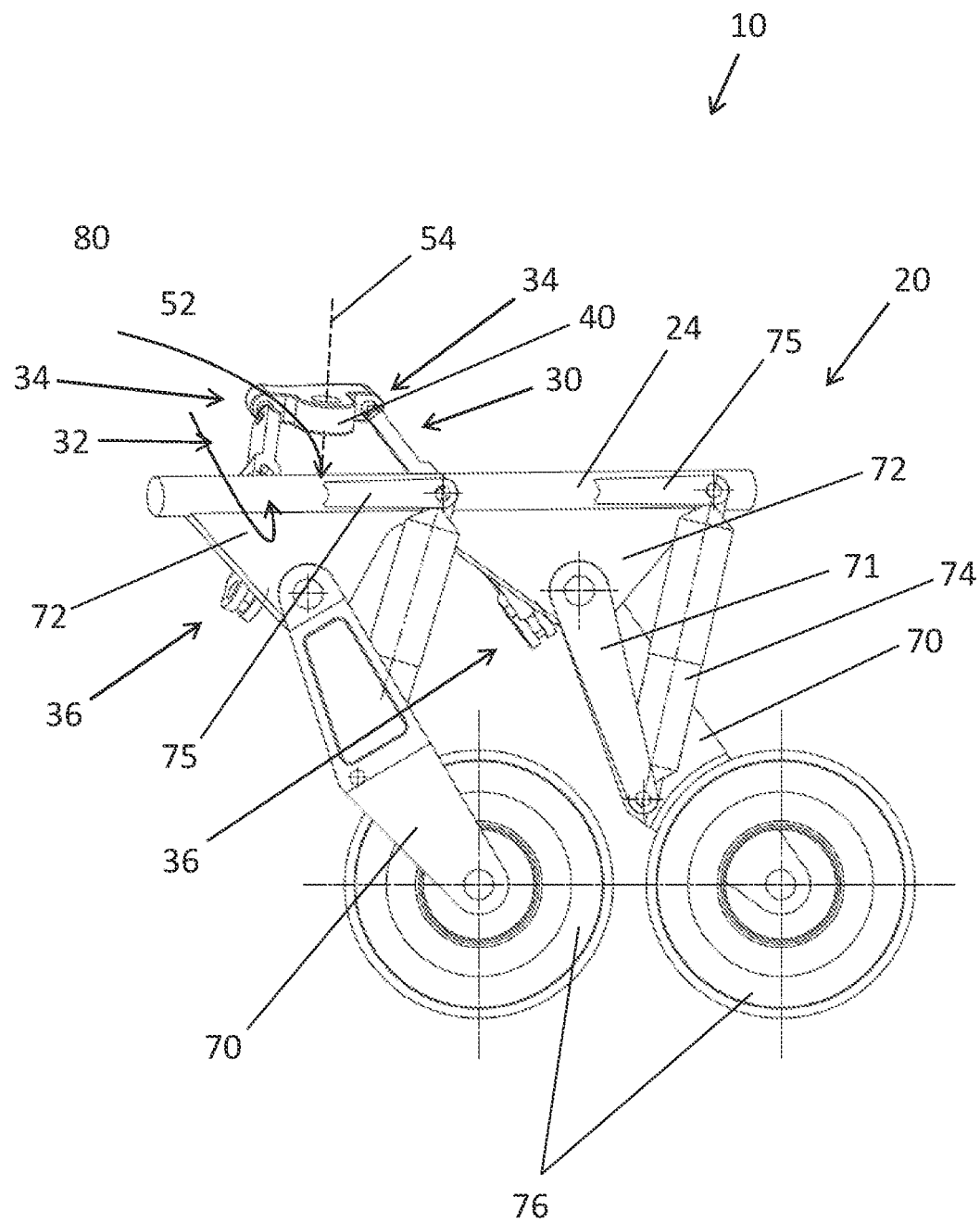
FIG. 7 shows a side view of the landing gear shown in FIG. 6, viewed in the inboard direction.
Figure 8:
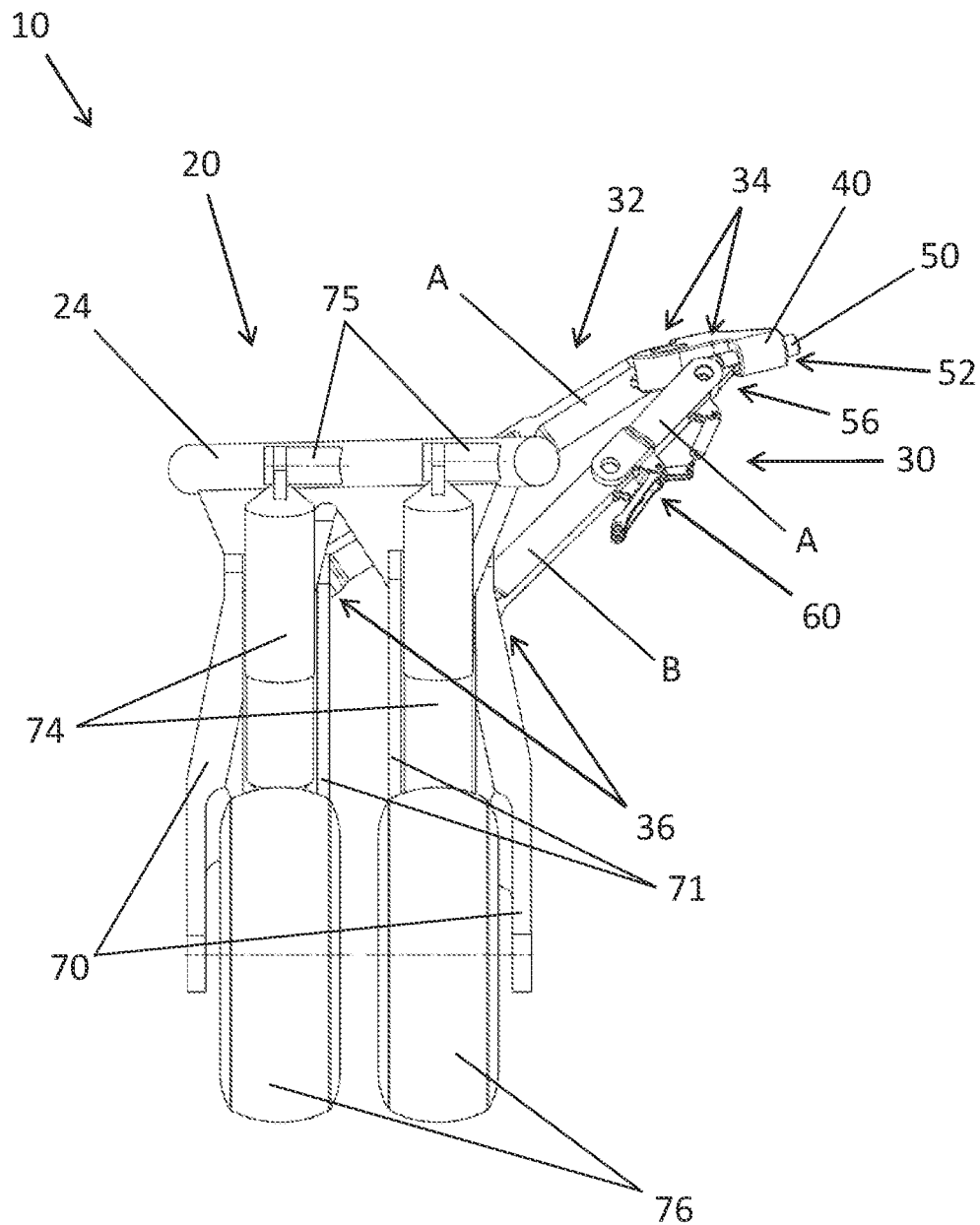
FIG. 8 shows a rear view of the landing gear shown in FIGS. 6 and 7.

FIGS. 2 to 4 show part of one of the main landing gear 10 in more detail, again in the deployed configuration. It has a main support 20 which has a main strut 22, a pintle 24 and an axle 28. The pintle 24 is aligned parallel to the roll axis of the aircraft 2, and is connected to a proximal end of the main strut and reinforced with a pair of ribs 26. The axle 28 is connected to a distal end of the main strut 22 and supports a pair of wheels (not shown). The landing gear 10 also has a first sidestay 30 in the form of a fore sidestay, and a second sidestay 32 in the form of an aft sidestay. Both sidestays 30, 32 of this embodiment are positioned on the same side of the main support 20 along the pitch axis of the aircraft 2, namely the inboard side.

The main support 22 and the sidestays 30, 32 are arranged to collectively transfer substantially all landing gear loads to the body 3 of the aircraft 2 when the landing gear is in the deployed configuration. That is to say that between them, the main support 20 and the sidestays 30, 32 transfer substantially all landing gear loads to the body 3, with negligible or no landing gear load being transferred by any other component. The extent to which the main support 20 and each sidestay 30, 32 transfer a particular landing gear load determines how much of that load each of these components transmits. In many cases the main support 20 and both sidestays 30, 32 will each transfer some of a landing gear load, however specific loads may only be transmitted by one or two of those components. In this specific case, the main support 20 is configured to bear substantially all vertical loading experienced by the landing gear 10 during normal use. Accordingly, the first and second sidestays 30, 32 are configured to bear substantially only drag loads and lateral loads. The sidestays 30, 32 may nonetheless experience a small percentage of a vertical load, however, due to slight elastic compression of the main support 20 (and/or the mounting by which it is attached to the body 3 of the aircraft 2).

Each sidestay 30, 32 extends between a first mounting point 34 at the body 3 of the aircraft 2 and a second mounting point 36 at the main support 20. The second mounting points 36 of the sidestays 30, 32 are provided on a yoke 40 which is attached to the main support 20 and movable with the main support between the deployed and stowed configurations. The yoke 40 is constrained for rotation about a yoke axis 42. More particularly, in this embodiment the yoke 40 is positioned around the main strut 22 of the main support 20 in the manner of a collar, with the yoke axis 42 running parallel to (and in this case substantially collinear with) the longitudinal axis of the main strut 22. The main strut 22 therefore forms the pivot member for the yoke 40. The yoke 40 is also held between opposing thrust faces 44, 46 provided on the main strut 22 which are positioned such that the yoke 40 is movable substantially only in rotation about the yoke axis 42—the upper thrust face 44 prevents upward translational movement of the yoke 40 and the lower thrust face 46 prevents downward translational movement of the yoke 40.

In this embodiment the sidestays 30, 32 converge towards the yoke 40 (or equally, it may be considered that the sidestays 30, 32 diverge away from the yoke 40). The first mounting point 34 of the first sidestay 30 is positioned further forward than its second mounting point 36 (as well as being further inboard), and the first mounting point 34 of the second sidestay 32 is positioned further aft than its second mounting point 36 (as well as also being further inboard). Whilst the sidestays 30, 32 converge towards the yoke 40, their respective second mounting points 36 are nonetheless provided at different locations on the yoke 40 about the yoke axis 42. More specifically, they are provided in opposing fixed positions on the yoke 40, substantially 180 degrees apart about the yoke axis 42. Indeed, in this embodiment the yoke 40 is symmetrical, both rotationally and about a line of symmetry that runs equidistantly between the two second mounting points 36.

The second mounting point 36 of each sidestay 30, 32, by which that sidestay is attached to the yoke 40, forms a joint which can permit relative movement between that sidestay 30, 32 and the yoke 40 so as to allow rotation of the yoke 40 about the yoke axis 42. In this case, each second mounting point 36 has a coupling member 50 which is rotatably attached to the yoke 40. Each coupling member 50 is received in a hole 52 in the yoke 40 so that it can rotate relative to the yoke 40 about an axis 54 (an example of a pivot joint axis) defined by that hole. In this embodiment the axis 54 is positioned at an angle of around 20 degrees to the yoke axis 42. If the yoke 40 were to rotate about the yoke axis 42, thanks to the rotational movement permitted by coupling members 50 being rotatable about axis 54, the sidestays could move relative to the yoke 40 about axes 54 so as to accommodate that movement. In contrast, in the absence of such a joint any rotation of the yoke 40 about the yoke axis 42 would force the sidestays 30, 32 to rotate along with it (or to deform).

Each coupling member 50 is not only rotatable relative to the yoke about axis 54, but is also rotatably attached to the sidestay 30, 32 in question. Each coupling member 50 is attached to the corresponding sidestay 30, 32 by a hinge joint 56 which allows pivoting of the sidestay 30, 32 relative to the coupling member 50 about an axis 58 which is perpendicular to axis 54. Accordingly, were the yoke 40 to be rotated about the yoke axis 42 then the change in horizontal position of the second ends 36 of the sidestays 30, 32 could be accommodated by generally upward/downward pivoting of the sidestays 30, 32 relative to the respective coupling members 50 (and thus relative to the yoke 40).

In the deployed position as shown in FIGS. 1 to 4, the main strut 22 is positioned upright, more particularly substantially vertical, when the aircraft 2 is level with the ground. Accordingly, with the main support 20 in the deployed configuration the yoke axis 42 is positioned substantially vertical too. The main support 20 (and thus the landing gear 10 as a whole) is movable from the deployed configuration to a stowed configuration by pivoting the main support 20 about the pintle 24 towards the sidestays 30, 32 and into a cavity (not visible) in the body 3 of the aircraft (in this case in the corresponding wing 6). Each sidestay 30, 32 comprises two longitudinal portions A, B which are pivotally connected to one another by a hinge joint 60. The hinge joints 60 allow the sidestays 30, 32 to fold, allowing their first and second mounting points 34, 36 to approach one another and thereby accommodating the pivoting movement of the main strut 22 to the stowed configuration. In this embodiment with the landing gear 10 in the stowed configuration, the landing gear 10 is contained substantially entirely inside the cavity (not visible) in the body 3 of the aircraft.

The sidestays 30, 32 each utilise an over-centre mechanism. As the main support 20 moves from the stowed configuration to the deployed configuration, the longitudinal portions A, B of the sidestays 30, 32 straighten about their respective hinge joints 60. The main support 20 reaches its final upright position while the sidestays 30, 32 are still slightly bent. Actuators (not shown) then push the sidestays 30, 32 straight, causing the main support 20 to move slightly past the upright position. The actuators then push the sidestays slightly past the straight position, and the main support 20 returns to the upright position. Sidestay locking members (not visible) then secure the sidestays 30, 32 in this over-centre position, thereby securing the landing gear 10 in the deployed configuration and giving the sidestays 30, 32 sufficient rigidity to withstand landing gear loads. Whilst the sidestays 30, 32 are slightly bent when the main support 20 is in the deployed configuration, as noted above, they nonetheless follow a generally straight path between their respective mounting points 34, 36. Indeed, the path followed by the sidestays 30, 32 in this embodiment is so close to straight as to appear completely straight to the naked eye (as shown in FIGS. 2 and 3).

In many circumstances manufacturing tolerances may mean that one or both of the sidestays 30, 32 reach their centre (i.e. straight) positions at slightly different positions of the main support 20 than the optimum position(s) for which the mechanism is designed, meaning that a small amount of elastic deformation of the landing gear is required. For example, in this embodiment during deployment of the landing gear the first sidestay 30 locks into its over-centre position before the second sidestay 32 reaches its centre position. With the first sidestay 30 locked, it resists the movement of the main support 20 which would allow the second sidestay 32 to reach its centre (i.e. straight) position. Thus, the second sidestay 32 can only reach its over-centre position through slight elastic deformation of the landing gear. This deformation exerts compressive stress on the two sidestays 30, 32, some of which remains once the aft landing gear 32 passes its centre position and reaches its over-centre position. With the landing gear 10 in the deployed configuration, compressive stress in the first sidestay 30 acts to urge the yoke 40 to rotate anticlockwise about the yoke axis 42, and compressive stress in the second sidestay 32 urges the yoke to rotate clockwise. The sidestays 30, 32 therefore reach an equilibrium, with the yoke 40 being held in a fixed rotational position.

As noted above, the second mounting points 36 of each sidestay 30, 32 form joints which can permit relative movement between that sidestay 30, 32 and the yoke 40 so as to allow rotation of the yoke 40 about the yoke axis 42. This can be advantageous in numerous different ways. Examples of such ways will be discussed below, in contrast with a hypothetical arrangement where this movement were not permitted due to coupling members 50 being immovably mounted to the yoke 40 (meaning that sidestays 30, 32 could only pivot about axes 58 relative to the yoke 40).

Firstly, the joints permitting rotation of the yoke 40 can enable easier assembly. In the hypothetical arrangement where this is not the case, if the tolerance stack in other components meant that the first mounting point 34 of the first sidestay 30 was too close to its second mounting point then either a correspondingly shorter sidestay 30 would have to be sourced (lengthening production time and potentially leading to parts scrappage) or a sidestay 30 would have to be forced into place, whereupon it would experience significant compressive loading and potentially warp or fail prematurely. With the second mounting points 36 of the sidestays 30, 32 permitting rotation of the yoke 40, however, some of the reduced space between mounting points 34, 36 of the first sidestay 30 could be taken up by the yoke 40 rotating anticlockwise about the yoke axis 42. This would have the effect of moving the mounting points 34, 36 of the first sidestay 30 further apart, at the expense of moving the mounting points 34, 36 of the second sidestay 32 closer together. This could reduce the compressive stress placed on the first sidestay 30 by splitting it between both sidestays 30, 32, reducing the requirement for a shorter sidestay 30 to be used and/or reducing the chances of warping or premature failure through excessive loading.

Secondly, the joints permitting rotation of the yoke 40 can spread loads more evenly between the sidestays 30, 32 during use. For example if the landing gear 10 were subject to a combined drag load and lateral load acting in the inboard direction, the resultant force would urge the main strut 22 generally inward and towards the rear. In the hypothetical arrangement discussed above, the majority of this load would be taken by the aft sidestay 32, with the fore sidestay 30 bearing comparatively little load. In contrast, with the joints permitting rotation of the yoke 40, the compressive load exerted on the aft sidestay 32 would cause the yoke 40 to rotate clockwise about the yoke axis 42. This, in turn, would urge the second mounting point 36 of the fore sidestay 30 towards its first mounting point, thereby transferring some of the load off the aft sidestay 32 and onto the fore sidestay 30. The loads would therefore be transferred to the body 3 of the aircraft more evenly.

Thirdly, rotation of the yoke 40 can assist with the over-centre mechanism by which the sidestays 30, 32 brace the main support 20. For instance, in the case described above where the second sidestay 32 reaching its over-centre position requires elastic deformation of the landing gear, when the second sidestay 32 passes its centre point, the compressive stress experienced by the sidestays 30, 32 is at a maximum. The joints permitting rotation of the yoke 40 can allow the yoke 40 to rotate so as to distribute this peak stress more evenly in a similar manner to that described above. Otherwise, the majority of the peak compressive stress would be bourn by the second sidestay 32 alone.

It will be appreciated that rotation of the yoke 40 having the effect of altering the distance between the mounting points 34, 36 of the sidestays 30, 32 is a particular benefit. The ability of the yoke 40 to do this depends to a large extent on the level of alignment of the plane in which the yoke 40 rotates and a plane containing the sidestays 30, 32. With these planes positioned at a relatively small angle to one another (or even parallel to one another if permitted by other design constraints), rotation of the yoke 40 can move the second mounting points 36 in a direction with a relatively large vector component in the direction of the first mounting points 34 (i.e. movement of a second mounting point 36 about the yoke axis 42 involves a relatively large movement towards/away from the corresponding first mounting point). In contrast, if the yoke 40 rotated in a plane at a relatively steep angle relative to the plane containing the sidestays 30, 32 then even relatively large movement of the second mounting points 36 by the yoke 40 may result in only minor changes in the distance between the second mounting points 36 and the first mounting points 34 of their respective sidestays 30, 32. In the present embodiment, the yoke 40 rotates about the yoke axis 42 in a plane (not shown) which is normal to the yoke axis (i.e. horizontal from the perspective of FIG. 3 and in the plane of the page from the perspective of FIG. 4) and the sidestays 30, 32 are positioned in a plane (not shown) which intersects the former at an angle of around 45 degrees.

A second example embodiment of the present invention will now be described with reference to FIGS. 5 to 12, in which like reference numerals denote corresponding features. The second embodiment has numerous similarities with the first embodiment, therefore only the differences will be described in detail.

Like that of the first embodiment, the aircraft 2 of the second embodiment has a body 3 comprising a fuselage 4 and two wings 6 (one of which is visible in FIG. 5), two main landing gear 10 and a nose landing gear 12. The landing gear 10, 12 are shown in the deployed configuration in FIGS. 5 to 8, and as with the first embodiment the nose landing gear 12 is not material to the present invention and discussion thereof will be omitted.

Each main landing gear 10 has a main support 20 which in this embodiment comprises a pintle 24 with a pair of trailing arms 70. The trailing arms 70 each support a wheel 76, with the two arms 70 positioned on opposite sides of their respective wheels 76 to one another—the trailing arm 70 towards the front of the landing gear 10 is outboard of its wheel 76, and the trailing arm 70 towards the rear of the landing gear 10 is inboard of its wheel 76.

The trailing arms 70 are pivotally connected to the pintle 24 via respective mounting flanges 72, and are also connected to the pintle 24 via respective shock absorbers 74 connected to attachment lugs 75 on the pintle 24. The main support 20 also has a pair of secondary linkages 71 positioned in conjunction with the trailing arms 70 and movable therewith. As with the first embodiment, each landing gear 10 also has first and second sidestays 30, 32 extending between first mounting points 34 provided at the body 3 of the aircraft and second mounting points 36 provided at the main support 20, and each landing gear 10 has a yoke 40 constrained for rotation about a yoke axis 42.

As with the first embodiment the sidestays 30, 32 are both positioned on the inboard side of the main support 20 and converge towards the yoke 40. In this case, however, the yoke 40 is fixed (specifically rotatably fixed) to the body 3 of the aircraft 2. A pivot member in the form of a pivot pin (not shown) of the body 3 is received within a bore 80 in the yoke 40, thereby defining the yoke axis 42, with thrust faces (not shown) above and below the yoke 40 to prevent translational movement of the yoke 40 axially along the pin. The yoke 40 is therefore movable only in rotation about the yoke axis 42. In this case, with the main support 20 in the deployed configuration the yoke axis 42 is positioned at around five degrees from the vertical.

With the yoke 40 provided on the body 3 of the aircraft 2, it is the first mounting point 34 of each sidestay 34 which is attached to the yoke 40. Accordingly, it is the first mounting point 34 of each sidestay 30, 32 and which forms a joint that can permit relative movement between that sidestay 30, 32 and the yoke 40 so as to allow rotation of the yoke 40 about the yoke axis 42. The second mounting point 36 of each sidestay 30, 32 takes the form of a hinge joint which allows pivoting motion between that sidestay 30, 32 and the main support 20.

Like the joints between the second ends 36 of the sidestays 30, 32 and the yoke 40 in the first embodiment, in this embodiment the joints between the sidestays 30, 32 and the yoke 40 each comprise a coupling member 50. Again, the coupling member 50 is received in a hole 52 in the yoke 40 such that it can rotate relative to the yoke 40 about an axis 54 defined by the hole 52, and again each coupling member 50 is rotatably attached to its respective sidestay 30, 32 by a hinge joint 56 which allows pivoting of the sidestay 30, 32 relative to the yoke 40 about an axis 58 perpendicular to axis 54. In this embodiment, however, it is the movement provided by the hinge joints 56 which permits relative movement between the sidestays 30, 32 and the yoke 40 so as to allow rotation of the yoke 40 about the yoke axis 42 (therefore axes 58 a form the pivot joint axes of this embodiment). If the yoke 40 were to rotate about the yoke axis 42, thanks to the rotational movement permitted by the hinge joints 56 the sidestays 30, 32 could move relative to the yoke 40 about axes 58 so as to accommodate that movement. In contrast, in the absence of such a joint any rotation of the yoke 40 about the yoke axis 42 would force the sidestays 30, 32 to rotate along with it (or to deform).

In similar fashion to the function of the movement permitted by the hinge joints 56 of the first embodiment, the movement permitted about axis 54 by the rotatable connection between each coupling member 50 and the yoke 40 provides a pivoting action which can allow changes in the horizontal position of the first ends 34 of the sidestays 30, 32 (due to rotation of the yoke 40) to be accommodated by up/down pivoting of the sidestays.

It will be appreciated that rotation of a coupling member 50 about axis 54, for reasons such as those discussed above in relation to the first embodiment, would changes the precise angle between the associated axis 58 and the yoke axis 42. However, in this embodiment with the main support 20 in the deployed configuration each axis 58 is positioned at an angle of around 45 degrees to the yoke axis 42.

Figure 9:
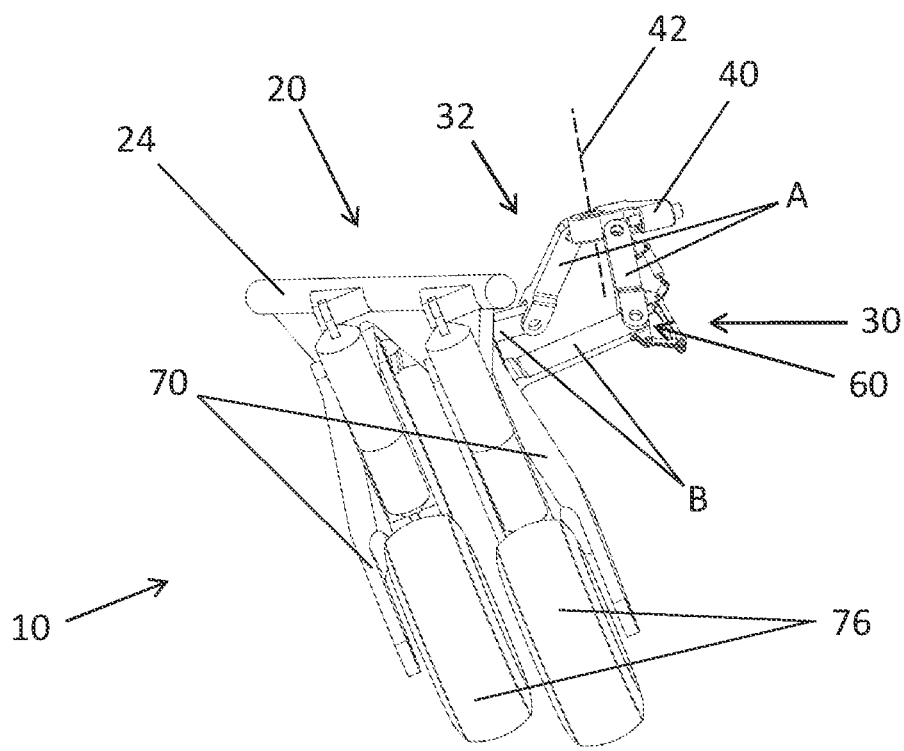
FIGS. 9 to 11 show rear views of the landing gear of FIGS. 6 to 8, in sequential stages during movement from the deployed configuration towards a stowed configuration.
Figure 10:
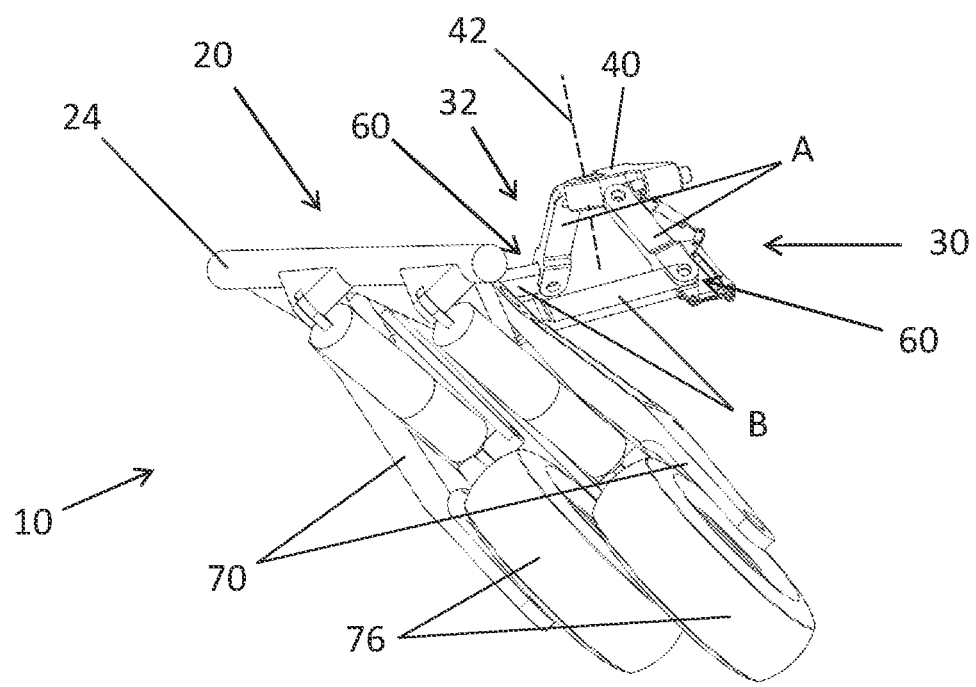
Figure 11:
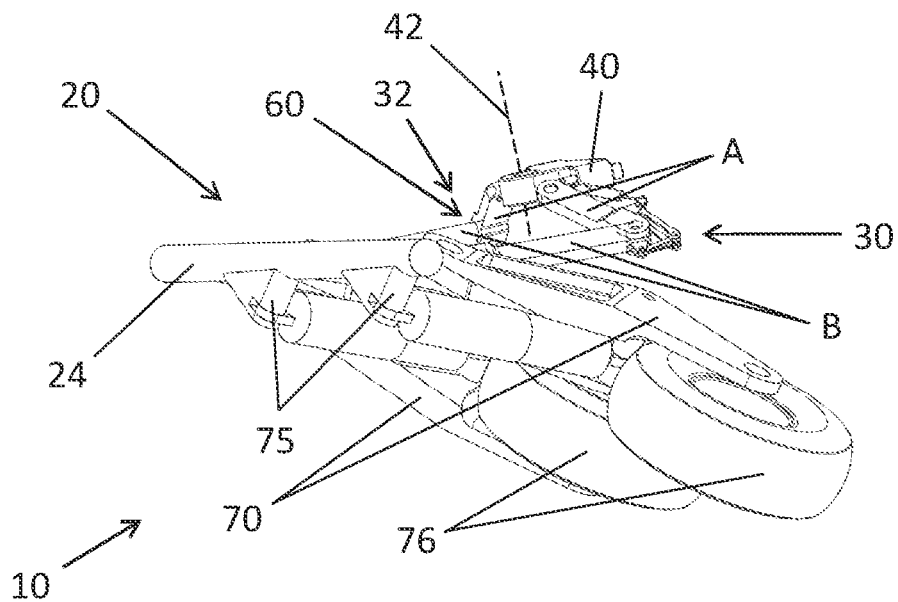
Figure 12:
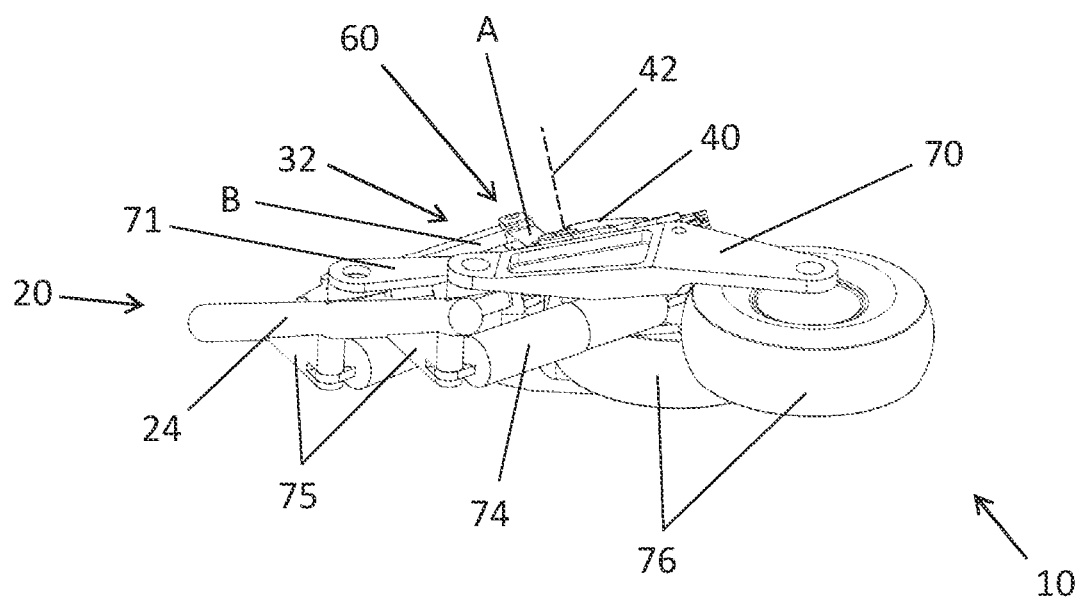
FIG. 12 shows a rear view of the landing gear of FIGS. 6 to 11, in the stowed configuration.

With the yoke 40 of the second embodiment being fixed on the body 3 of the aircraft 2, when the main support 20 is moved between the deployed and stowed configurations it moved relative to the yoke 40. More particularly, to move the main support 20 from the deployed configuration towards the stowed configuration, the main support 20 is pivoted about the pintle 24 towards the sidestays 30, 32 (and indeed towards the yoke 40). As illustrated in FIGS. 9 and 10, as the main support 20 moves towards the stowed configuration the sidestays 30, 32 fold about joints 60 in a similar manner as described above in relation to the first embodiment.

In the first embodiment the sidestays 30, 32 mirror one another about the path taken by the main support 20 between the deployed and stowed configurations. However, this is not the case in the second embodiment. Indeed, during movement of the main support 20 between configurations the first ends 34 of the sidestays 30, 32 are forced to move relative to the yoke axis 42. This movement is accommodated by corresponding rotation of the yoke 40 about the yoke axis 42.

It will be readily apparent that the first and second advantages discussed in respect of the first embodiment are equally applicable to the second embodiment. Furthermore, the sidestays 30, 32 of the second embodiment exhibit a corresponding over-centre mechanism as described in respect of the first embodiment. Accordingly, the third exemplary advantage also applies.

In the second embodiment, the specific design constraints at play allow the plane in which the yoke 40 rotates, and the plane occupied by the sidestays 30, 32 when the main support 20 is in the deployed configuration, to be nearer parallel to one another. More specifically, the two planes intersect each other at an angle of around 30 degrees.

Whilst the present invention has been described and illustrated with reference to particular embodiments, it will be appreciated by those of ordinary skill in the art that the invention lends itself to many different variations not specifically illustrated herein. By way of example only, the above embodiments utilise a total of two sidestays but other embodiments may use three or more. As another example, in other embodiments the yoke may be movable along the yoke axis to some extent, for instance to facilitate movement of the landing gear between deployed and stowed configurations.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The term 'or' shall be interpreted as 'and/or' unless the context requires otherwise.

The invention claimed is:

1. An aircraft comprising a landing gear, the landing gear comprising:
   a main support supporting one or more wheels, the main support being movable between stowed and deployed configurations relative to the body of the aircraft;
   at least first and second sidestays, each sidestay extending between a first mounting point at the body of the aircraft and a second mounting point at the main support; and
   a yoke constrained for rotation about a yoke axis, wherein:
   in use when the landing gear is in the deployed configuration, the main support and the sidestays are arranged to collectively transfer substantially all landing gear loads to the body of the aircraft; and
   one of said mounting points of each sidestay is provided on the yoke, and forms a joint arranged to permit relative movement between that sidestay and the yoke so as to allow rotation of the yoke about the yoke axis.

2. An aircraft according to claim 1, wherein with the main support in the deployed configuration, the sidestays are positioned to hold the yoke in a fixed rotational position about the yoke axis.

3. An aircraft according to claim 2, wherein with the main support in the deployed configuration, the first sidestay experiences stress which acts to urge the yoke to rotate about the yoke axis in one direction, and the second sidestay experiences stress which acts to urge the yoke to rotate about the yoke axis in the opposite direction.

4. An aircraft according to claim 1, wherein the yoke is constrained so as to be substantially prevented from translational movement when the main support is in the deployed configuration.

5. An aircraft according to claim 1, wherein the mounting points of the first and second sidestays that are provided on the yoke are provided at different locations on the yoke about the yoke axis.

6. An aircraft according to claim 5, wherein the joint of each sidestay includes a coupling member which is rotatably attached to the yoke and rotatably attached to the respective sidestay, wherein each coupling member is rotatable relative to the yoke about a first axis, and rotatable relative to the respective sidestay about a second axis which is generally perpendicular to the first axis.

7. An aircraft according to claim 1, wherein the yoke is rotatable in a rotation plane which is normal to the yoke axis, and with the main support in the deployed configuration the sidestays define a sidestay plane, the rotation plane and the sidestay plane being positioned at an angle of no more than 60 degrees to one another.

8. An aircraft according to claim 1, wherein with the main support in the deployed configuration, each of said joints allows relative rotation between the respective sidestay and the yoke about an axis which is positioned at an angle of no more than 60 degrees to the yoke axis.

9. An aircraft according to claim 1, wherein with the main support in the deployed configuration, the sidestays converge towards the yoke.

10. An aircraft according to claim 1, wherein with the main support in the deployed configuration:
    the first mounting point of the first sidestay is provided further forward than the second mounting point of the first sidestay; and
    the first mounting point of the second sidestay is provided further aft than the second mounting point of the second sidestay.

11. An aircraft according to claim 1, wherein with the main support in the deployed configuration, the sidestays are positioned on the same side of the main support along the pitch axis of the aircraft.

12. An aircraft according to claim 1, wherein at least one of the sidestays comprises two longitudinal portions which are pivotally connected to one another so as to allow said sidestay to fold.

13. An aircraft according to claim 1, wherein the main support and the sidestays are configured such that movement of the main support from the deployed configuration towards the stowed configuration includes movement of the main support towards the sidestays.

14. An aircraft according to claim 1, wherein the sidestays and yoke are arranged such that movement of the main support between the deployed and stowed configurations brings about relative movement between the sidestays and the yoke axis, that relative movement being accommodated by rotation of the yoke about the yoke axis.

15. An aircraft according to claim 1, wherein the yoke is attached to the main support and movable therewith, wherein the main support comprises a main strut and the yoke is rotatably mounted around said strut in the manner of a collar.

16. An aircraft according to claim 1, wherein the yoke is rotatably fixed to the body of the aircraft, the main support moving relative to the yoke when moving between the stowed and deployed configurations.

17. An aircraft comprising a landing gear, the landing gear comprising:
- a main support supporting one or more wheels, the main support being movable between stowed and deployed configurations relative to the body of the aircraft;
- a yoke mounted on the body of the aircraft, the main support moving relative to the yoke when moving between the stowed and deployed configurations; and
- at least first and second sidestays, each sidestay extending between a first mounting point on the yoke and a second mounting point at the main support, wherein:
- the yoke is mounted for rotation about a yoke axis relative to the body of the aircraft;
- each first mounting point forms a pivot joint between the yoke and the respective sidestay which has a pivot joint axis; and
- each pivot joint axis is non-perpendicular to the yoke axis.

18. A method of distributing landing gear loads in an aircraft including a landing gear comprising:
- a main support supporting one or more wheels, the main support being movable between stowed and deployed configurations relative to the body of the aircraft;
- at least first and second sidestays, each sidestay extending between a first mounting point at the body of the aircraft and a second mounting point at main support; and
- a yoke constrained for rotation about a yoke axis, one of said mounting points of each sidestay being provided on the yoke and forming a joint arranged to permit relative movement between that sidestay and the yoke,
- wherein when the landing gear is in the deployed configuration and under load, the yoke moves relative to each of the sidestays and rotates about the yoke axis so as to redistribute forces between the sidestays.

19. A landing gear for use in an aircraft, comprising:
- a main support supporting one or more wheels, the main support being movable between stowed and deployed configurations relative to a body of the aircraft;
- at least first and second sidestays, each sidestay extending between a first mounting point at the body of the aircraft and a second mounting point at the main support; and
- a yoke constrained for rotation about a yoke axis, wherein:
- in use when the landing gear is in the deployed configuration, the main support and the sidestays are arranged to collectively transfer substantially all landing gear loads to the body of the aircraft; and
- one of said mounting points of each sidestay is provided on the yoke, and forms a joint arranged to permit relative movement between that sidestay and the yoke so as to allow rotation of the yoke about the yoke axis.

* * * * *